US008060384B2

(12) United States Patent
Landry

(10) Patent No.: US 8,060,384 B2
(45) Date of Patent: *Nov. 15, 2011

(54) PROGRAM FOR ALTERNATIVE FUNDING OF EMPLOYEE AND RETIREE BENEFITS

(75) Inventor: Karin Landry, Boston, MA (US)

(73) Assignee: Spring Consulting Group, LLC, Boston, MA (US)

( * ) Notice: Subject to any disclaimer, the term of this patent is extended or adjusted under 35 U.S.C. 154(b) by 1861 days.

This patent is subject to a terminal disclaimer.

(21) Appl. No.: 10/995,325

(22) Filed: Nov. 24, 2004

(65) Prior Publication Data

US 2006/0111946 A1 May 25, 2006

(51) Int. Cl.
*G06Q 40/00* (2006.01)
(52) U.S. Cl. ............... 705/4; 705/35; 705/36 R; 705/40
(58) Field of Classification Search ............... 705/1, 14, 705/35, 36, 40, 4, 38, 2, 39, 50, 30; 434/107; 713/186, 168
See application file for complete search history.

(56) References Cited

U.S. PATENT DOCUMENTS

| 5,136,502 | A | * | 8/1992 | Van Remortel et al. | .......... 705/2 |
| 5,806,042 | A | * | 9/1998 | Kelly et al. | .......... 705/4 |
| 2001/0049612 | A1 | * | 12/2001 | Davis | .............. 705/4 |
| 2003/0135395 | A1 | | 7/2003 | Carfi et al. | |
| 2006/0111946 | A1 | * | 5/2006 | Landry | .............. 705/4 |
| 2006/0111996 | A1 | | 5/2006 | Landry | |
| 2006/0173720 | A1 | | 8/2006 | Berens et al. | |
| 2008/0228660 | A1 | | 9/2008 | Dearden | |
| 2008/0288295 | A1 | | 11/2008 | Caballero et al. | |
| 2009/0276371 | A1 | | 11/2009 | Landry | |
| 2010/0256997 | A1 | | 10/2010 | Landry | |

OTHER PUBLICATIONS

Landry, Karin et al., "Retiree Rule May Spur Captive Use", National Underwriter, May 24, 1993.*
"Retiree Rule May Spur Captive Use" Mational Underwriter Property & Casualty / Risk & Benefits Management Edition by Karin J. Landry and Henry DeVos Lawrie Jr. May 24, 1993.*
Geisel, Jerry, "Whirlpool Crafts Innovative Plan to Fund Benefits", Business Insurance, Aug. 16, 2004.
Geisel, Jerry, "DOL Ruling Opens Door to Benefits in Captives", Business Insurance, Aug. 21, 2000.
"Whirlpool Funding Plan Worth a Look", Business Insurance, Aug. 23, 2004.
Geisel, Jerry, "DOL Denies Fast-Track for Whirlpool Benefits Captive", Business Insurance, Sep. 20, 2004.
Strazewski, Len, "Captive Growth", Human Resource Executive, May 16, 2003.
Wright, Bruce et al., "DOL Issues Proposed Exemption on Funding Benefits Through Captive", www.captive.com.

(Continued)

*Primary Examiner* — Kirsten Apple
*Assistant Examiner* — John H Holly
(74) *Attorney, Agent, or Firm* — Jones Day

(57) ABSTRACT

An insurance program for funding benefits by maintaining assets in the insurance program that includes an employer or employee owned trust account and at least one life insurance contract obtained directly or indirectly from a captive insurance company. The life insurance contract is purchased with assets from the trust account and the captive insurance company is a least partially owned by the employer. When paying or reimbursing benefits, the employer or the trust may pay the benefit and if the employer pays the benefit, the trust may reimburse the employer.

36 Claims, 4 Drawing Sheets

OTHER PUBLICATIONS

Goff, Dick, "Branch Captives in D.C.", Captive Insurance Council of the District of Columbia, Inc., 2005.

Girer, Chris, "International Paper Seeks to Reinsure Benefits with Captive", A.M. Best Company, Inc., 2003.

"DOL Approves Use of Captive for Employee Benefits", Alternative Views, ACSG Newsletter, Issue 25, Nov. 2003.

Landry, Karen et al., "Rethinking Retiree Medical: Medicare Reform and the Implications for Employers", Sep. 15, 1998.

Landry, Karen, "Post-Retirement Benefits Funding", Oct. 4, 2010.

Landry, Karen, "Reconsidering Retiree Medical Funding" Apr. 1998.

Geisel, Jerry, "Coke Uncaps Captive Plan; New Tack for Retiree Care" Dec. 1, 2008.

Tompkins, Wayne, "New Accounting Rule Give Cities Credit Concerns", Public Finance, Jun. 26, 2008.

Stanton, Timothy, "Retiree Health Financing Idea Links VEBA, Bermuda Insurer" Business Insurance, Nov. 13, 1995.

Fundling, Jay et al., "Retiree Medical Funding—You May Be Stuck With It" Benefits Across Borders, Dec. 2009.

Kelly, Susan, "You Can Retire, But Don't Get Sick", Treasury & Risk, Sep. 2004.

Geisel, Jerry, "Whirlpool Scraps funding Plan for Retiree Care", Business Insurance, Dec. 13, 2004.

International Search Report dated Jun. 29, 2010 for PCT/US2010/0032667.

Wright, P. Bruce et al., et al., "DOL Issues Proposed Exemption on Funding Benefits Through Captive", Mar. 2003.

\* cited by examiner

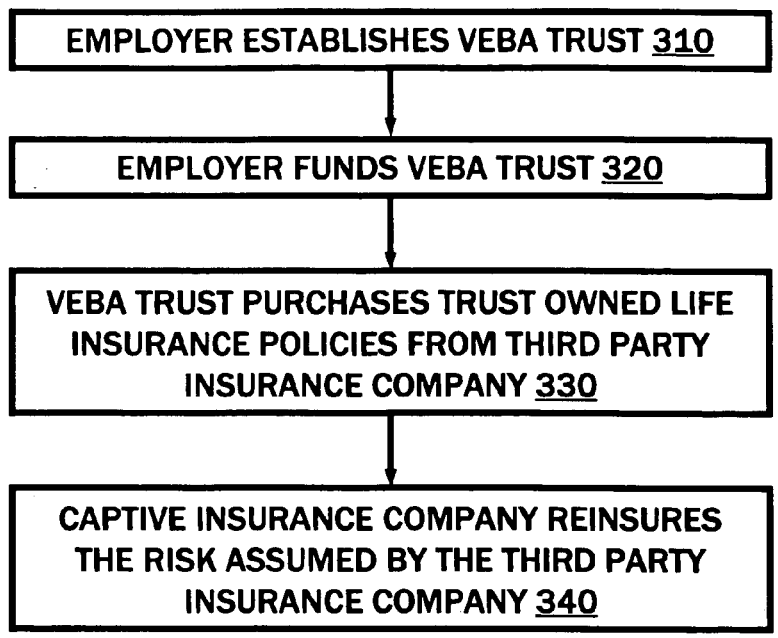
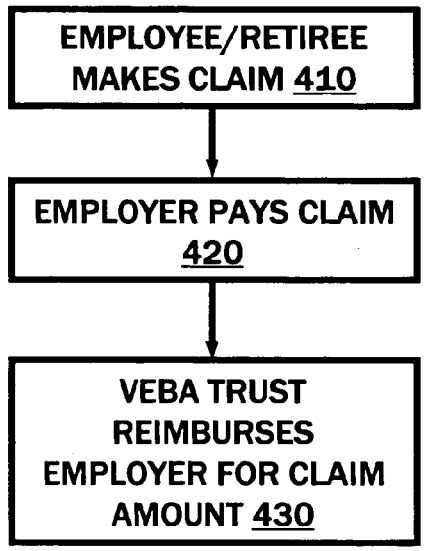
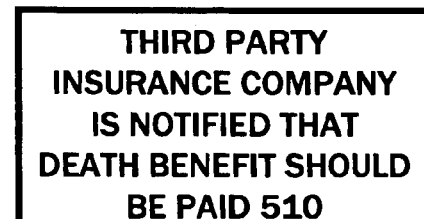
FIGURE 3
FIGURE 4
FIGURE 5

US 8,060,384 B2

PROGRAM FOR ALTERNATIVE FUNDING OF EMPLOYEE AND RETIREE BENEFITS

BACKGROUND OF THE INVENTION

1. Field of the Invention

The present invention relates generally to facilitating and/or providing benefits to employees and retirees. More specifically, the present invention relates to a computer implemented system and method for configuring, optimizing, managing and tracking alternative funding of employee and retiree benefits and benefit plans.

2. Description of Related Art

Conventionally, employers have provided benefits to employees and retirees and have paid for these benefits using employer's funds. More recently, benefits, including medical costs, have become very expensive and as a result, employers have scaled their benefit offerings and, in some cases, insisted that the employees pay a portion of the cost for these benefits. Some corporations have also required that employees rely entirely on self funded retirement.

Additionally, commonly accepted accounting practices have essentially forced employers to reflect these benefits to employees and retirees as liabilities on corporate financial statements.

This trend has put a substantial strain on employers, on employees and their families, and on retirees and their families that were promised benefits after retirement. Employers appear to carry costly liabilities and employees are having to pay more for fewer services. Accordingly, a system is needed to assist employers in controlling the cost of their programs and to ensure that employers are financially able to provide the maximum affordable benefits to employees and retirees and that the employees and retirees get an appropriate level of benefits.

BRIEF SUMMARY OF THE INVENTION

In one embodiment, the present invention provides a method for funding benefits by maintaining assets in an investment program comprising, an employer or employee owned trust account and at least one life insurance contract obtained directly or indirectly from a captive insurance company. The life insurance contract is purchased with assets from the trust account and the captive insurance company is a least partially owned by the employer. When paying or reimbursing benefits, the employer or the trust may pay the benefit and if the employer pays the benefit, the trust may reimburse the employer.

In another embodiment, the present invention allows the trust or the captive insurance company to invest its assets in commercially available vehicles to generate additional assets, and in certain embodiments the investment may be in the employer's own securities including short term commercial paper.

In yet another embodiment, the present invention provides a method of funding benefits where the captive insurance company is wholly or partially owned by the employer, is a rent-a-captive, a protective cell captive, or any other form of a captive insurance company as defined and authorized by the respective domicile of the captive insurance company.

In yet another embodiment, the present invention provides benefits including, for example, health care benefits, retirement benefits, executive compensation, and/or life insurance. These benefits may be provided to employees and/or retirees.

In yet another embodiment, the present invention utilizes a trust including, for example, a Voluntary Employee Beneficiary Association (VEBA) Trust or a Rabbi Trust as the beneficiary and to name at least one employee receiving benefits from the employer as the insured person on the life insurance contract.

BRIEF DESCRIPTION OF THE DRAWINGS

Additional, features, and advantages of the various embodiments of the present invention will become apparent from the following detailed description of embodiments of the invention in conjunction with the accompanying drawings where like reference numerals indicate like features, in which:

FIG. 3 is a flow chart illustrating how benefits may be paid when an employee/retiree makes a claim in accordance with an embodiment of the present invention; and FIG. 4 is a flow chart illustrating how death benefits are paid in accordance with the present invention.

FIG. 5 is a flow chart illustrating how benefits or claims on behalf of an insured are paid in accordance with an embodiment of the present invention.

DETAILED DESCRIPTION OF EMBODIMENTS

Figure 1:
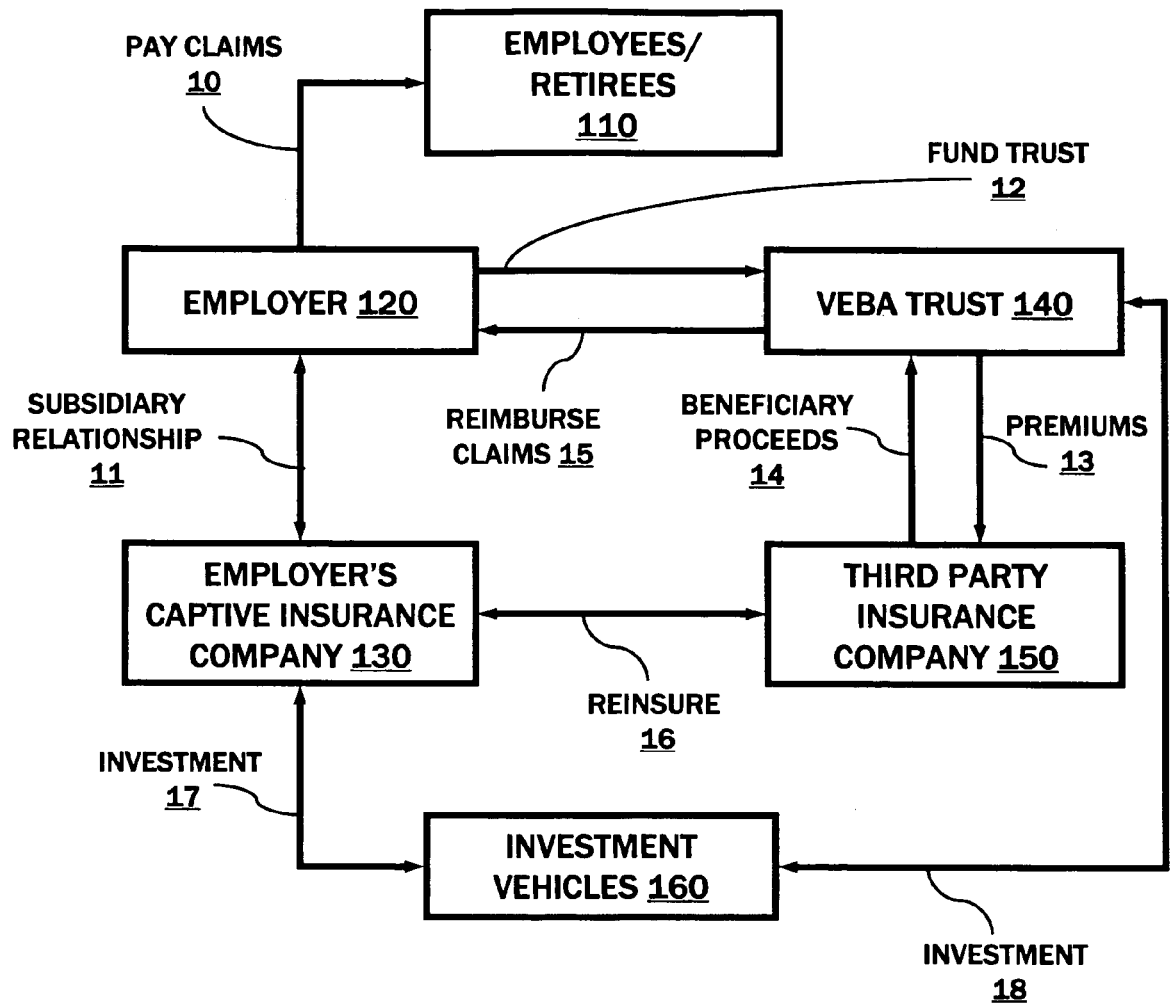
FIG. 1 is a schematic drawing of a funding program for employee and retiree benefits in accordance with an embodiment of the present invention.

FIG. 1 is a schematic drawing of an alternative funding program for employee and retiree benefits in accordance with an embodiment of the present invention. As illustrated in FIG. 1, the funding program includes an employer 120 (or union or association in some embodiments), a captive insurance company 130, a Voluntary Employee Beneficiary Association (VEBA) trust 140 and a third party insurance company 150.

FIG. 3 is a flow chart illustrating the operation of a funding program in accordance with an embodiment of the present invention. As best illustrated in FIG. 3, but with reference to FIG. 1, the employer 120 establishes a VEBA trust 140 in a first step 310. Next, in step 320, the employer 120 funds the VEBA trust 140. With the funding 12, the VEBA trust 140, as indicated by step 330, purchases Trust Owned Life Insurance (TOLI) policies from a third party insurance company 150. The third party life insurance company 150 reinsures the TOLI policies with the employer's captive insurance company 130. Accordingly, as illustrated by step 340, the captive insurance company 130 reinsures and assumes some or all of the risk assumed by the third party insurance company 150.

As illustrated in the embodiment of FIG. 1, the employer 120 and the captive insurance company 130 have a subsidiary relationship 11. Specifically, in some embodiments, the captive insurance company 130 may be a wholly owned subsidiary of the employer. Alternatively, in other embodiments, the captive insurance company 130 may be a partially owned subsidiary of the employer 120. In fact, there are several arrangements between the captive insurance company 130 and the employer 120 that would provide similar benefits as a subsidiary relationship 11. As would be readily understood by a person of ordinary skill in the art, a group captive insurance company (i.e., a captive insurance company that is shared between a group of employers 120) may provide similar advantages while reducing the cost attributed to each employer. These types of captive insurance companies may be referred to as risk retention groups or association captives. Alternatively, other forms of captive insurance companies 130 may include, for example, agency captives, branch captives and rent-a-captives.

In general, however, the captive insurance company 130 is defined by the domicile of the captive insurance company. For example, in embodiments, the captive insurance company may be domiciled in Vermont (generally a "captive friendly" state). According to Title 8, Section 6001 of the Vermont Statute definition of a captive insurance company is any pure captive insurance company, association captive insurance company, sponsored captive insurance company, industrial insured captive insurance company, or risk retention group formed or licensed under the provisions of this chapter. For purposes of this chapter, a branch captive insurance company shall be a pure captive insurance company with respect to operations in this state, unless otherwise permitted by the commissioner. The section further defines, for example, a pure captive insurance company as any company that insures risks of its parent and affiliated companies or controlled unaffiliated business. These definitions are exemplary of statutes that may exist in other states as well. Of course, as would be generally understood by a person of ordinary skill in the art, many variations of the definition may exist based on for example, the domicile of the captive insurance company 130. In other embodiments, the term "captive" is used generally to describe an insurance company that insures the risk of its owners who are not in the business of insurance.

As would be understood by a person of ordinary skill in the art, each of these captive insurance company examples have their respective benefits and should be selected to meet an employer's needs. Additionally, the present invention should not be limited to the specific types of captives discussed above, any type or form of captive insurance company would fall within the scope of the present invention.

In the embodiment illustrated in FIG. 1, the employer 120 and the VEBA trust 140 exchange funds. The funding 12 can occur in numerous manners, for example, the funding 12 may be an initial funding, a periodic funding and/or a non-periodic funding. The funding provides the VEBA trust 140 with assets/money. Additionally, as shown in the embodiment of FIG. 1, the VEBA trust 140 reimburses 15 the employer 120. Specifically, in the illustrated embodiment, the employees/retirees 110 may make a claim to the employer which may be reimbursed by the VEBA trust 140. Examples of claims may include, for example, reimbursement for medical expenses, death benefit, etc.

FIG. 4 is a flow chart illustrating one procedure by which benefits may be paid when an employee/retiree makes a claim in accordance with an embodiment of the present invention. Upon receipt of the claim, as shown by step 410, the employer 120 will pay the claim 10, illustrated by step 420. After paying the claim 10, in step 430, the VEBA trust 140 may reimburse the employer 120 for at least a portion of the claim 10.

As would be understood by a person skilled in the art, various modifications of this embodiment may be possible. For example, the claim may be paid directly by the VEBA trust 140 or it might not be the employee/retiree 110 making a request, it may be a third party such as a hospital or a creditor of the employee/retiree 110. Additionally, a request may not even be required in some embodiments. Specifically, the employer 120 or VEBA trust 140 may have some other arrangement in place to pay for these benefits, for example, by paying a third party to handle such claims.

Additionally, although the above embodiment describes a VEBA trust 140, it should be understood that any trust may be utilized within the scope of this invention. The VEBA trust is established under Title 26 of the U.S. Code and there are several benefits of VEBA trusts that make its use beneficial. For example, some permissible benefits that a trust (including, for example, a VEBA) may pay for include life, health, accident, and other benefits to participants. The other benefits, according to Treasury regulations may include vacation benefits, subsidized recreational activities (e.g., athletic leagues), child care facilities, job readjustment allowances and income maintenance payments in case of economic dislocation, temporary living expense loans and grants in times of disaster, supplemental unemployment compensation, severance benefits, education or training benefits, supplemental executive retirement programs (SERP), non-qualified deferred compensation, and personal legal service benefits. Additionally, there are tax advantages that an employer may use to their benefit by using a VEBA trust. Of course, these benefits would be apparent to a person skilled in the art. Other trusts may also be used. For example, a Rabbi trust or Grantor trust are other examples of trusts that may be beneficial in the context of the present invention. Other trusts that may be beneficial will depend on the employer's specific situation. Additionally, it should be understood by a person skilled in the art that certain trusts may be owned by employees of the employer instead of the employer directly.

As previously mentioned, the VEBA trust 140 may purchase life insurance contracts with the funds that it receives. As illustrated in FIG. 1, the VEBA trust 140 pays premiums 13 to a third party insurance company 150. The third party insurance company 150 issues an insurance policy where an employee, former employee, or retiree, or a group of such employees, former employees, or retirees (or any combination thereof) is the insured and the VEBA trust 140 is the beneficiary of the life insurance contract. Accordingly, when the insured person dies, the third party insurance company 150 pays the beneficiary proceeds 14 to the VEBA trust 140.

In accordance with embodiments of the present invention, the VEBA trust 140 may acquire any combination of life insurance policies on any group of persons. Of course, as would be understood by a person of ordinary skill in the art, there are legal limits for insurance policies on whom and how much an insurance policy can be for. For example, many government regulations require that the beneficiary have an "insurable interest" in the person(s) named on the policy. Accordingly, it would be difficult, but not out of the scope of the present invention, to select arbitrary persons to name on life insurance policies.

Additionally, there are often tax advantages to investing in life insurance policies. Accordingly, as would be readily understood by a person of ordinary skill in the art, it may, in certain embodiments, be beneficial to invest a maximum acceptable amount of funding from the VEBA trust 140 to pay premiums 13 on life insurance policies. Although, in some embodiments, the VEBA trust 140 assets may also be invested 18 in other investment vehicles 160. More about this type of investment is discussed below.

The insurance policies that are issued by the third party insurance company 150 are then reinsured 16 by the employer's captive insurance company 130. By reinsuring 16 the insurance policies, the employer's captive insurance company 130 assumes the risk of the policies (i.e., the employer's captive insurance company assumes liability for the payment of at least a portion of the beneficiary proceeds 14) from the third party insurance company 150 in exchange for a premium paid to the employer's captive insurance company 130. Accordingly, the third party insurance company is sometimes called a fronting company since the third party insurance company may only be involved in administering the policy. Additionally, in some embodiments, the third party insurance company may also be secondarily liable for the beneficiary proceeds.

In an embodiment of the present invention, the employer's captive insurance company 130 assumes the entire risk from the third party insurance company 150; in other embodiments, the employer's captive insurance company may only assume a portion of the risk. If the entire risk is assumed, then the third party insurance company is a fronting company. The premiums 13 paid by the VEBA trust 140 may be forwarded to the employer's captive insurance company 130, often less a fee retained by the third party insurance company 150 for their initial and ongoing services.

Figure 2:
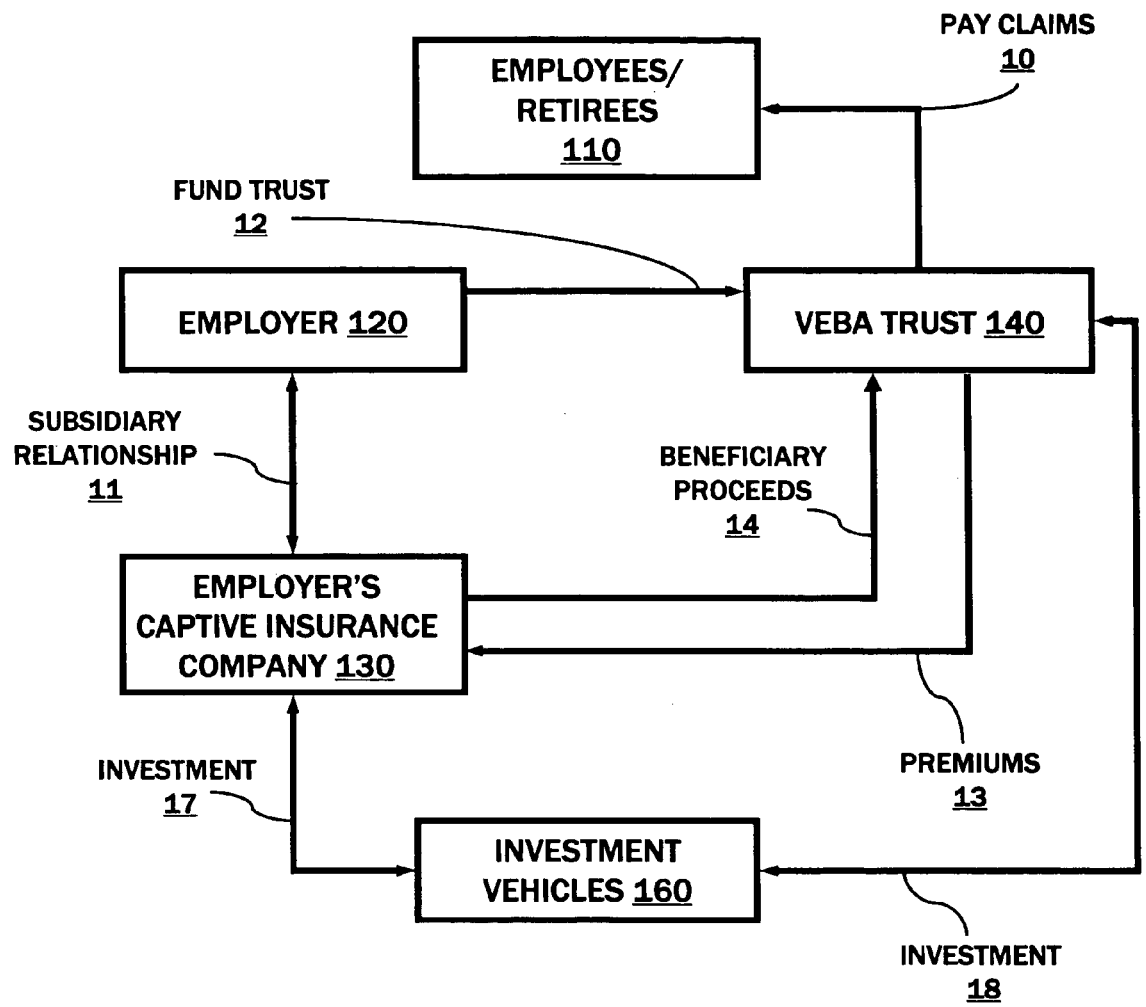
FIG. 2 is a flow chart illustrating the operation of a funding program in accordance with an embodiment of the present invention.

In some embodiments, the third party insurance company 150 may not be necessary and the employer's captive insurance company 130 may simply assume both roles. Specifically, as illustrated in FIG. 2, which is a schematic drawing of another embodiment of a funding program in accordance with an embodiment of the present invention, the reinsurance may not be necessary if the captive insurance company 130 is able to assume both rolls. However, the third party insurance company is beneficial to the employer, especially if the employer has employees/retirees 110 in several states. For example, the employer's captive insurance company may not be as large as a traditional commercial insurance provider. The limited size of the captive insurance company, may prevent it from being able to write life insurance contracts in all of the necessary states. Accordingly, a well established third party insurance company 150 may provide this function, generally for a small administrative fee. In general, the various functions of an insurance company, including administrative functions, paying benefits, and collecting premiums, may be distributed between the third party insurance company and the captive insurance company in any manner that is acceptable for satisfying the employer's needs.

Additionally, as discussed above, FIG. 2 also illustrates an embodiment of a funding program where the VEBA trust 140 pays benefits directly.

FIG. 5 is a flow chart illustrating how death benefits are paid in accordance with an embodiment of the present invention. As previously mentioned, if the employer's captive insurance company 130, assumes any portion of the risk, it may be responsible for paying the beneficiary proceeds 14 discussed above. Accordingly, FIG. 5 is one embodiment of how the beneficiary proceeds 14 may reach the VEBA trust 140. When the third party insurance company 150 is notified that death benefits need to be paid, at step 510, the third party insurance company 150 subsequently pays the beneficiary proceeds 14 to the VEBA trust 140 at step 520. The captive insurance company 130 is notified and reimburses the third party insurance company 150 for at least a portion of the paid beneficiary proceeds 14, at 530.

As would be readily understood by a person skilled in the art, other variations of this process may also be utilized. For example, in embodiments, the employer's captive insurance company 130 may pay the beneficiary proceeds 14 directly to the VEBA trust 140. This may provide additional benefits to the employer depending on the specific situation.

As discussed above, premiums may be paid by the third party insurance company 150 to the employer's captive insurance company 130 in exchange for the employer's captive insurance company 130 assuming the risk. Depending on various laws that may exist related to how the employer's captive insurance company utilizes the funds that it receives, the employer's captive insurance company 130 invests 17 its funding into investment vehicles to generate additional funds.

In one embodiment, for example, a life insurance contract may be configured to maximize the cash value of the contract. The cash value of a life insurance contract, as would be readily understood by a person or ordinary skill in the art, is the current value of the assets that support the benefits under the life insurance contact. Generally, and within legal limits and for a given level of death benefits, this value is maximized by paying a premium that is equal to the required amount for a fixed value policy plus some additional amount that accumulates over time to increase a cash value. For example, if a $1 million policy has mortality and administrative costs of $400 per year, a policy holder, in this case the VEBA trust 140, may pay $1000 per year instead of the minimum $400. In this case, an additional $600 per year is invested at a predetermined or variable rate of return. Over time the accumulation of the $600 annual payments increases the cash value of the life insurance policy. In some cases, the return on the cash value may eventually be enough to pay the $400 minimum such that the insurance policy is kept in force without additional premium payments. Additionally, in certain embodiments, the policy value may also increase such that when the beneficiary proceeds 14 are paid, the proceeds may total, for example, $1.5 million.

The employer's captive insurance company 130, uses the additional funds, over its minimum premium and in some embodiments an additional administrative fee, and invests this funding in investment vehicles 160.

Several investment vehicles may be utilized by either the employer's captive insurance company 130 and or the VEBA trust 140. One such investment vehicle is an investment in the employer's own securities including the employer's short term commercial paper. The short term commercial paper provides the necessary return that a captive insurance company or trust may seek while maintaining the liquidity of the assets. Liquidity, as should be readily understood by a person of ordinary skill in the art, may be important since both the captive insurance company and the VEBA trust may need to make fairly large payments without much notice.

As would be understood by a person skilled in the art, other conventional investment vehicles 160 either alone or in combination with short term commercial paper or any other investment vehicles 160 would also be acceptable. Examples of some other investment vehicles may include, for example, commercial stocks, bonds, commodities, real estate, interest bearing accounts, etc.

The principles and features of the present invention may also be implemented in a computer readable medium. For example, a computer can be programmed to establish a funding system in accordance with the principles described above that meets an individual employer's needs.

In one embodiment, the computer program would be programmed to include information on the laws regarding the VEBA trust 140, the third party insurance company 150, and the employer's captive insurance company 130. The incorporated laws may include, for example, the required legal structure of each entity, the maximum and minimum funding required for each entity, the types of activities which may be regulated for each entity, and the tax advantages and disadvantages of using each entity. Of course, as would be understood by a person of ordinary skill in the art, other information that may be relevant may also be included. The program would accept, as inputs, several key pieces of information regarding the employer 120. For example, this information, in one embodiment may include, the legal structure of the employer 120, the benefits liability of the employer 120, the assets of the employer 120, and the projected future liabilities and assets of the employer 120. Based on these inputs and the information stored within the program, the program may be able to determine what structure the funding system should embody, how much funding should be provided to the trust, what type of trust should be utilized, whether a third party insurance company 150 should be utilized, which third party insurance company 150 should be utilized, what type of captive insurance company 130 should be utilized, and what type or types of investment vehicles should be utilized.

Of course, the above computer implemented method is merely an embodiment of the present invention, and it should be understood that various modifications, additions, and deletions are contemplated depending on the particular situation.

In additional embodiments, the computer implemented method may also be implemented to optimize certain aspects of the present invention. The above program described a computer implemented method that assisted an employer in determining the most advantageous arrangement for funding benefits. Once the arrangement is determined, it may be beneficial for employers to optimize the arrangement to their specific needs. In one embodiment, the software may be utilized for any combination of administration of the funding system, optimization of the funding system, performance tracking of the funding system, or managing of the funding system.

For example, the software may be configured to maximize the cash value of the life insurance policies while allowing a user to track the assets and liabilities of the system and determine future projections for the state of the system. In another embodiment, the software may allow a user to optimize the amount of funds that are paid to the trust to optimize the tax benefits of the funding system. In another embodiment, the software may be able to determine the optimum investment strategy for the funds provided to the trust or to the captive insurance company.

Figure 6:
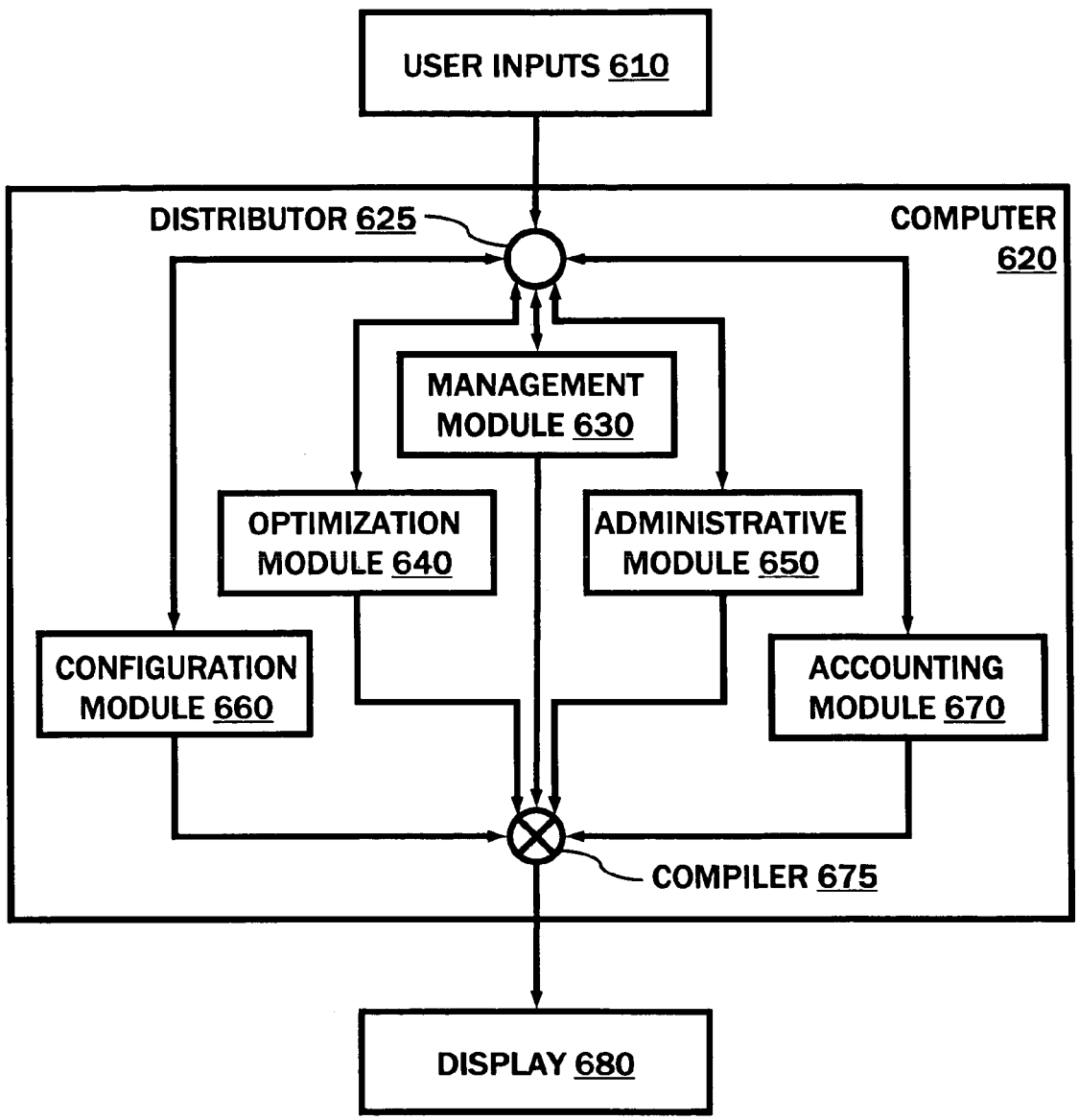
FIG. 6 is a flow chart of a computer system for implementing a funding program in accordance with an embodiment of the present invention.

FIG. 6 is a flow chart of a computer system relating to or for implementing a funding program in accordance with an embodiment of the present invention. The computer system of FIG. 6 includes user inputs 610, a computer 620, and a display 680. In this embodiment, the computer 620 includes 5 modules; a configuration module 660, an optimization module 640, a management module 630, an administrative module 650, and an accounting module 670. The computer can be any electronic device capable of performing the desired function. Likewise, the modules described can be discrete or integrated and can be implemented in software or hardware. As described above, the user inputs 610 may include a number of relevant parameters including, for example, information regarding the corporate structure, the corporate assets, and the corporate liabilities. These user inputs may be input into the computer 620 via a distributor 625. The distributor 625, gathers the information and forwards it to at least one of the modules. Often, the distributor 625 may also convert the data into a form that is more easily interpreted by the modules. The modules each contain parameters and calculating means for using the user inputs 610, where necessary, to obtain the relevant outputs. Additionally, in some embodiments, the modules may be able to communicate with each other. As discussed above, and in more detail below, these parameters and calculating means can be any appropriate information. For example, with respect to the management module 630, the user inputs 610, information from the configuration module 660, information from the optimization module 640 and the parameters specific to the management module, may be used to allow a user to determine several management parameters. Based on, for example, the configuration module 660, the management module may track assets in the trust account, assets paid by the employer, investment return, or proceeds from the reinsurance from the captive insurance company. Additionally, based on the optimization module 640 information and the user inputs 610, the management module 630 may be able to determine, for example, that additional assets are necessary from the employer in six months to ensure the trust is properly funded. Additionally, reports can be generated related to paid benefits, or other parameters. The details of the interaction of these parameters are discussed below.

Additionally, as seen in FIG. 6, to allow a user to utilize the information calculated by the modules (e.g., the software program), outputs are displayed on a display 680 via a compiler 675. The compiler 675 allows the computer 620 to use the output from several modules, for example the accounting module 670 and optimization module 640, at the same time. Since these parameters may be interconnected, it may, in some embodiments, be beneficial for a user to be able to view the information simultaneously. Of course, FIG. 6 is exemplary and several variations of the embodiment of FIG. 6 should be apparent to a person of ordinary skill in the art.

Several variations for optimization, reporting, administration, tracking and managing will be apparent to a person of ordinary skill in the art. Generally, however, the list below illustrates several variables or assumptions that may be beneficial for the computer implemented system (or the method in general) of the present invention.

| (1) | Year | The number of years the software may calculate data for. |
|---|---|---|
| (2) | Number of Lives Covered | The starting number of participants. May assume death rates based on any acceptable means. May also account for new employees |
| | | Policy Accounting |
| (3) | Insurance Face Amount | Face amounts are set for the policy to qualify as Life Insurance and to determine whether the policy is treated as a Modified Endowment Contract (MEC) or not. |
| (4) | Premium | Assets paid to trust to establish and fund the insurance contract. |
| (5) | Number of Deaths | Estimated number of deaths are computed based on any acceptable means. |
| (6) | Death Benefits | Death benefits are actuarially determined by the expected deaths and the insurance face amounts |
| (7) | Loads | Basis points charged to the policy. |
| (8) | Surrenders | The amount of cash value that is withdrawn or surrendered. May also be a partial surrender. |
| (9) | Investment Earnings | Expected investment return rate based on any acceptable means. |
| (10) | End of Year Cash Value | Based on actuarial projections. |
| (11) | End of Year Basis | Based on actuarial projections. |
| (12) | Policy Cash Flow | Premium adjusted for death benefits and surrenders. From the corporate point of view, this is the amount of money the employer is spending on the policy or getting back from it. |
| | | Captive Cash Flow |
| (13) | Direct Premium | The same as (4). |
| (14) | Reinsurance Ceded | Mortality risk is assumed to be reinsured. It assumes a percentage load by the reinsurance company. |

-continued

| | | |
|---|---|---|
| (15) | Net Premium | Direct premium less reinsurance ceded. This is the net annual premium amount retained by the captive. |
| (16) | Total Death Benefits | Death benefits are calculated based on the pre-determined group premium (4). |
| (17) | Reinsurance Recovery | Generally equal to the benefits received from the reinsurer. |
| (18) | Net Death Benefits | Total Death Benefits (16) less Reinsurance Recovery (17). Net Death Benefits may be paid from the Cash Value. |
| (19) | Surrenders | The same as (8). |
| (20) | Premium Tax | Premium tax is calculated based on the sliding scale. For example, Vermont captive insurance premium tax rates are applied to direct premiums. |
| (21) | Expenses | Program administration expenses for this program. |
| (22) | Investable Assets | These are the assets generating investment earnings. Beginning of year invested assets (24) plus annual net premium adjusted for death benefits (18), surrenders (19), expenses (21) and DAC Tax (30). |
| (23) | Investment Earnings | Investment earnings based on any acceptable means. |
| (24) | Cash Tax Expense | Captive's annual income tax (46) adjusted for DAC Tax. |
| (25) | Beginning of Year Invested Assets | Prior year's End of Year Invested Assets (25), $0 in year 1. |
| (26) | End of Year Invested Assets | Beginning of Year Invested Assets (25) plus Investment Earnings (23) and Net Premium (15), less Net Death Benefits (18), Surrenders (19), Premium Tax (20), Expenses (21) and Cash Tax Expense (24). |

Deferred Acquisition Cost (DAC)

| | | |
|---|---|---|
| (27) | Current Year DAC | The lesser of a given percentage of premiums and the captive expenses (premium tax and administration expenses). |
| (28) | Amortization | DAC amortization. |
| (29) | Unamortized DAC | Prior year's Unamortized DAC (prior year's 29) plus Current Year DAC (27) minus Amortization (28). |
| (30) | Deferred Tax Asset | Accumulated DAC payments that will be recovered through future amortization. A percentage tax is applied to the Unamortized DAC (29). |

The Captive Income Statement section below represents the impact of the TOLI transaction on the Captive's Income Statement.

| | | |
|---|---|---|
| (31) | Direct Premiums | The same as (4). |
| (32) | Reinsurance Ceded | The same as (14). |
| (33) | Net Premiums | The same as (15). |
| (34) | Investment Income | The same as (23). |
| (35) | Gross Income | Net Premiums (33) plus Investment Income (34). |
| (36) | Death Benefits Incurred | The same as (6). |
| (37) | Reinsurance Recoveries | The same as (17). |
| (38) | Net Death Benefits | The same as (18). |
| (39) | Surrenders | The same as (19). |
| (40) | Increase in Policy Reserves | Equal to the annual change in End of Year Cash Value (annual change in 10). |
| (41) | Total Benefit Expense | The total benefit expense paid by the captive; Sum of Net Death Benefits (38), Surrenders (39), Increase in Policy Reserves (40). |
| (42) | Premium Tax | The same as (20). |
| (43) | Other Expense | The same as (21). |
| (44) | Total Expense | Sum of Total Benefit Expense (41), Premium Tax (42), Other Expense (43). |
| (45) | Pretax Income | Gross Income (35) minus Total Expense (44). |
| (46) | Income Tax | A percentage tax that is applied to Pre-tax income (45). |
| (47) | Net Income | Pretax Income (45) minus Income Tax (46). |

The Captive Balance Statement section below represents the impact of the TOLI transaction on the Captive's Balance Sheet.

| | | |
|---|---|---|
| (48) | Investments | Equal to the End of Year Invested Assets (26). |
| (49) | Unamortized DAC | Equal to the Deferred Tax Asset (30). |
| (50) | Total Assets | Investments (48) plus Unamortized DAC (49). |
| (51) | Liabilities (Policy Reserves) | Equal to the End of Year Cash Value (10). |
| (52) | Capital | Additional funds needed for capital. If captive is already capitalized, no additional funds will be needed for capital. |
| (53) | Retained Earnings | Net Income (47) plus prior year's Retained Earnings (53) |
| (54) | Total Shareholder Equity | Capital (52) plus Retained Earnings (53). |
| (55) | Total Liabilities and Equity | Liabilities (Policy Reserves) (51) plus Total Shareholder Equity (54). |

Financing/Alternative use of Assets

The section below computes the opportunity cost of captive funding. The cash that would have been used elsewhere, i.e., the employer's other investments in the initial years, will be consolidated under the Life Insurance program.

| | | |
|---|---|---|
| (56) | Policy Cash Flow | The same as (12). |
| (57) | Capitalization of Captive | The same as (52). |
| (58) | P&C Premium Effected | Amount of P&C premium that is affected by the employee benefits funding. For example, IRS Revenue Ruling 2002-89 requires that 50% of the captive's business stem from unrelated parties (e.g. employee benefits) for the remaining P&C premiums to be deductible. |
| (59) | Accumulated P&C Deduction | P&C reserves that can be used to determine deductible amount. |
| (60) | Current P&C Deduction | Annual change in the accumulated P&C Deduction (annual change in 59). |
| (61) | P&C Deduction Value | Value of the accelerated tax deduction. A percentage tax rate applied to the Current P&C Deduction (60). |
| (62) | Net Cash Flow Difference | The amount that employer needs to finance. Sum of Policy Cash Flow (56), Capitalization (57) and P&C Deduction Value (61). |

| | | |
|---|---|---|
| (63) | Beginning of Year Value Exchanged COLI | What a company owned policy (COLI) would be worth if the Plan continued to hold it. Prior year's Beginning of Year Value of Exchanged COLI policy (prior year's 63) plus Expected Earnings (65). In year 1, COLI Exchanged (64) is also included in the Beginning of Year Value Exchanged COLI. |
| (64) | COLI Exchanged | Expected value of the COLI assets that will be transferred to the TOLI program when the benefits are funded through the captive. |
| (65) | Expected Earnings | Beginning of Year Value Exchanged COLI (63) earnings adjusted for the COLI policy load (80 bp). |
| (66) | Beginning of Year Assets | The assets that have not yet been sold to finance the TOLI policy. Prior year's Beginning of Year Assets (66) plus prior year's Tax Effect minus prior year's assets sold. For year 1, this is the amount of current assets. |
| (67) | Asset Earnings | The amount of assets the program would have had if the assets had not been transferred to the TOLI program. Earnings at an assumed rate on the assets available for investments, i.e., Beginning of Year Assets (66) adjusted for Assets Sold (70). |
| (68) | Tax Effect | Percentage tax rate applied to Asset Earnings (67). |
| (69) | Beginning of Year Value Assets Sold | Prior year's Asset Sold (prior year's 70) plus prior year's Expected Earnings (prior year's 71) minus prior year's Tax Effect (prior year's 72). |
| (70) | Assets Sold | Sell assets when the Beginning of Year Value Assets Sold (69) is positive to cover the Net Cash Flow Difference (62) if COLI Exchanged (64) alone is unable to pay out the Net Cash Flow Difference (62). |
| (71) | Expected Earnings | Expected earnings at a determined percentage on net assets investable into mutual funds in a given year; i.e. percentage applied to Beginning of Year Value SERP Mutual Funds Sold (69) plus Mutual Funds Sold (70). |
| (72) | Tax Effect | Percentage tax on Expected Earnings (71). |

Loan/Repayment accounting. This section illustrates the impact of the TOLI transaction on the loans of the employer.

| | | |
|---|---|---|
| (73) | Beginning of Year Loan Balance | When COLI Exchanged (64) and Assets Sold (70) are not enough to meet Net Cash Flow Difference (62), loans are needed to cover the Net Cash Flow Difference (62). This amount is equal to the prior year's End of Year Loan Balance (prior year's 77). |
| (74) | (Borrowing)/ Repayment | Net Cash Flow Difference (62) less COLI Exchanged (64), Mutual Funds Sold (70), other Debt Incurred, and Other Assets Sold. |
| (75) | Value of Funds | Interest on Beginning of Year Loan Balance (73) and (Borrowing)/Repayment (74). |
| (76) | Tax Effect | Tax impact of loan interest. Value of Funds (75) times tax rate |
| (77) | End of Year Loan Balance | Beginning of Year Loan Balance (73) adjusted for additional loans, interest and tax impact of interest; Sum of Beginning of Year Loan Balance (73), (Borrowing)/Repayment (74) and Value of Funds (75), less Tax Effect (76). |

The Unconsolidated Earnings Impact (Employer) section below represents the impact of the TOLI transaction on Employer's Income Statement.

| | | |
|---|---|---|
| (78) | Investment Earnings | Equal to Expected Earnings (71) of Assets, which is the earnings if the assets would not have been sold. |
| (79) | Other Income | Policy earnings offset by reserve earnings. Note: Other Income may not be subject to tax. Sum of Increase in Policy Reserves (40), Policy Cash Flow (56) and Expected Earnings (65) on the COLI Exchanged. |
| (80) | Total Revenue | Investment Earnings (78) plus Other Income (79). |
| (81) | Interest Expense/ Credit | Interest expense/credit on corporate debt. Equal to −Value of Funds (−75). |
| (82) | Pretax Income | Total Revenue (80) minus Interest Expense (81). |
| (83) | Tax | Tax on Expected Earnings on (72) plus tax impact of the loan (76). |
| (84) | After-tax Income | Pretax income (82) minus Tax (83). Generating book value while generating tax deductions. |

The Unconsolidated Balance Sheet Impact (Employer) section below represents the impact of the TOLI transaction on Employer's Balance Sheet.

| | | |
|---|---|---|
| (85) | Cash and Investments | Reduction in investments due to the sale of assets. Equal to the following year's Beginning of Year Value SERP assets Sold (the following year's 69). |
| (86) | Other Assets | Increase in the Life Insurance Assets. Liabilities (Policy Reserve) (51) plus the following year's Beginning of Year Value Exchanged COLI (the following year's 63). |
| (87) | Deferred Tax Asset | If employer carries a Deferred Tax Asset which they would recognize when claims are paid in the future. That deduction may now be accelerated under the captive program and will be converted into cash. Accumulation of P&C Deduction Value (accumulation of 61). |
| (88) | Investments in Captive | Accumulation of the Capitalization of the Captive (accumulation of 57). If the captive is already capitalized, there is no initial capital and subsequent accumulation of capital. |
| (89) | Total Assets | Sum of Cash and Investments (85), Other Assets (86), Deferred Tax Asset (87) and Investments in Captive (88). |
| (90) | Liabilities/ Loans | Equal to the End of Year Loan Balance (77). |
| (91) | Shareholder Equity | Accumulation of After-tax Income (accumulation of 84). |
| (92) | Total Liabilities and Equity | Liabilities/Loans (90) plus Shareholder Equity (91). |

Consolidated Impact

| | | |
|---|---|---|
| (93) | Net Income | Consolidated Net Income of the captive and employer. Captive's Net Income (47) plus Employer's After-tax Income (84). |
| (94) | Shareholder Equity | Consolidated shareholder equity of the captive and Employer. Captive's Shareholder Equity (54) plus Employer's Shareholder Equity (91). |

In embodiments, any combination of these variables, and others that will be apparent to a person skilled in the art, can be used to establish, optimize, report, administer, track, and manage the funding system of the present invention. Additionally, some of the above variables may be input by a user, others may be internally determined based on several factors. In one embodiment, the effective tax rates may be determined according to current state and federal regulations. In other embodiments, a user may be able to input a percentage for the same tax rates. Additionally, as would be understood by a person skilled in the art, some of these variables may be determined by complex statistical models. For example, the death rate may be a complex statistical distribution or a simple rate. For some employers, it may be sufficient to indicate that, for example, a death rate of 2 people per year. However, in other embodiments, the employer may desire a particular distribution of the deaths. Several models may be used, in this embodiment, based on the employer's needs.

The embodiments described herein are intended to be illustrative of this invention. As will be recognized by those of ordinary skill in the art, various modifications and changes can be made to these embodiments and such variations and modifications would remain within the spirit and scope of the invention defined in the appended claims and their equivalents. Additional advantages and modifications will readily occur to those of ordinary skill in the art. Therefore, the invention in its broader aspects is not limited to the specific details and representative embodiments shown and described herein.

What is claimed is:

1. A computer implemented method for funding benefits, said computer implemented method comprising:
    electronically accepting, by a computer, inputs related to specific employer information;
    electronically determining, by the computer, an amount of funding to provide to an employer or employee owned trust account;
    electronically calculating, by the computer, what portion of said funding to use to purchase at least one life insurance contract;
    electronically determining, by the computer, and based at least, on said benefits liability of said employer, assets of said employer, and projected future benefits liability and assets of said employer, whether to purchase said at least one life insurance contract from a non-captive insurance company or a captive insurance company; and
    electronically determining, by the computer, what portion of said at least one life insurance contract should be reinsured by said captive insurance company if said at least one life insurance contract is purchased from said from non-captive insurance company;
    wherein said trust is the beneficiary of said at least one life insurance contract; and
    wherein said captive insurance company is an insurance company that insures a risk of said employer who is not solely in the business of insurance.

2. The computer implemented method of claim 1, wherein said at least one life insurance policy is purchased from said non-captive life insurance company.

3. The computer implemented method of claim 1, further comprising:
    estimating benefit amounts to be paid or reimbursed by said employer or said trust.

4. The computer implemented method of claim 1, further comprising, determining what commercially available vehicles said at least one of said trust and said captive insurance company invests assets in to generate additional assets.

5. The computer implemented method of claim 1, further comprising determining that said captive insurance company invests at least a portion of assets in securities of said employer.

6. The computer implemented method of claim 5, wherein said securities is short term commercial paper of said employer.

7. The computer implemented method of claim 1, further comprising, determine whether said captive insurance company should be partially owned by said employer or wholly owned by said employer.

8. The computer implemented method of claim 1, further comprising, determining whether said trust should be a Voluntary Employee Benefit Association Trust.

9. The computer implemented method of claim 1, further comprising, determining whether said trust should be a Rabbi Trust.

10. The computer implemented method of claim 1, further comprising, determining which individuals receiving benefits from said employer should be an insured on said at least one life insurance contract.

11. The computer implemented method of claim 1, further comprising, configuring said at least one life insurance contract to maximize a cash value of said at least one life insurance contract for a predetermined period of time, or to optimize at least one of a premium, a death benefit or another variable in accordance with an employer's needs.

12. The computer implemented method of claim 1, wherein the trust is at least partially owned by said employer.

13. The computer implemented method of claim 1, wherein the trust is at least partially controlled by said employer.

14. A computer system for funding benefits, said computer system comprising:
    at least one computer configured to:
        accept user inputs related to specific employer information;
        determine an amount of funding to provide to a trust account;
        determine what portion of said funding to use to purchase at least one life insurance contract to optimize a tax benefit to said employer;
        determine, based at least, on said benefits liability of said employer, assets of said employer, and projected future benefits liability and assets of said employer, whether to purchase said at least one life insurance contract from a non-captive insurance company or a captive insurance company; and
        determine what portion of said at least one life insurance contract should be reinsured by said captive insurance company if said at least one life insurance contract is purchased from said non-captive insurance company;
    wherein said trust is the beneficiary of said at least one life insurance contract; and
    wherein said captive insurance company is an insurance company that insures a risk of said employer who is not solely in the business of insurance.

15. The computer system of claim 14, wherein said modules determines to purchase said at least one life insurance contract from said non-captive life insurance company.

16. The computer system of claim 14, wherein said modules are further configured to estimate benefit amounts to be paid or reimbursed by said employer or said trust.

17. The computer system of claim 14, wherein said modules are further configured to determine what commercially available vehicles said at least one of said trust and said captive insurance company invests assets in to generate additional assets.

18. The computer system of claim 14, wherein said modules are further configured to determine an amount that said captive insurance company invests in securities of said employer.

19. The computer system of claim 18, wherein said securities is short term commercial paper of said employer.

20. The computer system of claim 14, wherein said modules are further configured to determine whether said captive insurance company should be partially owned by said employer or wholly owned by said employer.

21. The computer system of claim 14, wherein said modules are further configured to determine whether said trust should be a Voluntary Employee Benefit Association Trust or a Rabbi Trust.

22. The computer system of claim 14, wherein said modules are further configured to select which individuals receiving benefits from said employer should be an insured on said at least one life insurance contract.

23. The computer system of claim 14, wherein said modules are further configured to determine how to maximize a cash value of said at least one life insurance contract for a predetermined period of time, or to optimize at least one of a premium, a death benefit or another variable in accordance with an employer's needs.

24. The computer system of claim 14, wherein the trust is at least partially owned by said employer.

25. The computer system of claim 14, wherein the trust is at least partially controlled by said employer.

26. A system for funding benefits, said system comprising:
at least one computer, a benefits provider company, an employer owned trust account or employee owned trust account, a non-captive insurance company, and a captive insurance company;
wherein said system is configured to perform at least the following steps:
determining an amount of funding to provide to an employer or employee owned trust account;
calculating what portion of said funding to use to purchase at least one life insurance contract;
determining, based at least, on said benefits liability of said employer, assets of said employer, and projected future benefits liability and assets of said employer, whether to purchase said at least one life insurance contract from a non-captive insurance company or a captive insurance company; and
determining what portion of said at least one life insurance contract should be reinsured by said captive insurance company if said at least one life insurance contract is purchased from said from non-captive insurance company;
wherein said trust is the beneficiary of said at least one life insurance contract; and
wherein said captive insurance company is an insurance company that insures a risk of said employer who is not solely in the business of insurance.

27. The system of claim 26, wherein the trust is at least partially owned by said employer.

28. The system of claim 26, wherein the trust is at least partially controlled by said employer.

29. The system of claim 26, wherein said trust is instructed to purchase said at least one life insurance contract from said non-captive life insurance company.

30. The system of claim 26, wherein said trust and said captive insurance company are instructed as to what assets said at least one of said trust and said captive insurance company invests in to generate additional assets.

31. The system of claim 26, wherein said captive insurance company is instructed as to what amount said captive insurance company invests in securities of said employer.

32. The system of claim 31, wherein said securities is short term commercial paper of said benefits provider.

33. The system of claim 26, wherein said captive insurance company is formed by said benefits provider and is either partially owned by said benefits provider or wholly owned by said benefits provider.

34. The system of claim 26, wherein said trust is one of a Voluntary Employee Benefit Association Trust or a Rabbi Trust.

35. The system of claim 26, wherein said trust is instructed as to which individuals receiving benefits from said benefits provider should be an insured on said at least one life insurance contract.

36. The system of claim 26, wherein said at least one life insurance contract is configured to maximize a cash value of said at least one life insurance contract for a predetermined period of time, or to optimize at least one of a premium, a death benefit or another variable in accordance with said benefits provider's needs.

* * * * *